United States Patent [19]

Jacobowitz et al.

[11] Patent Number: 5,333,225
[45] Date of Patent: Jul. 26, 1994

[54] SUBSTRATE-EMBEDDED PLUGGABLE RECEPTACLES FOR CONNECTING CLUSTERED OPTICAL CABLES TO A MODULE

[75] Inventors: Lawrence Jacobowitz; Mario E. Ecker, both of Poughkeepsie; Casimer M. DeCusatis, Lake Katrine, all of N.Y.

[73] Assignee: International Business Machines Corporation, Armonk, N.Y.

[21] Appl. No.: 101,119

[22] Filed: Aug. 3, 1993

[51] Int. Cl.$^5$ ............................. G02B 6/00; G02B 6/36
[52] U.S. Cl. .................................... 385/93; 333/254; 385/88
[58] Field of Search ................................ 385/88-94, 385/65, 59; 257/80, 81, 431-433; 333/156, 160, 260, 254

[56] References Cited

U.S. PATENT DOCUMENTS

| | | | |
|---|---|---|---|
| 4,291,943 | 9/1981 | Binek et al. ................. | 385/59 X |
| 4,322,127 | 3/1982 | Comerford et al. ................ | 385/65 |
| 4,553,813 | 11/1985 | McNaughton et al. ............ | 385/89 |
| 4,553,814 | 11/1985 | Bahl et al. ..................... | 385/86 |
| 4,707,067 | 11/1987 | Haberland et al. ................ | 385/90 |
| 5,155,786 | 10/1992 | Ecker et al. ................. | 385/94 |
| 5,173,668 | 12/1992 | Jacobowitz et al. ............. | 333/156 |
| 5,241,614 | 8/1993 | Ecker et al. ................. | 385/94 |

OTHER PUBLICATIONS

Balliet, L. et al., "Built-In Alignment Circuit For Fiber-Optic Silicon Optical Bench", IBM Technical Disclosure Bulletin, vol. 24, No. 2, pp. 1158-1160, Jul. 1981.
Brady, M. J. et al., "Self-Aligned Optical Fiber/Laser Structure", IBM Technical Disclosure Bulletin, vol. 26, No. 11, pp. 5993-5995, Apr. 1984.

Primary Examiner—Akm E. Ullah
Attorney, Agent, or Firm—Bernard M. Goldman

[57] ABSTRACT

Obtains a large increase in the number of fiber optic inputs/output (I/O) lines connectable to a module by enabling edge connection of multiple clusters of optical fibers to be connected around a module. Each connector connects a cluster of optical fibers in a small dimension of space on the module. Many distinct pluggable connectors may be provided along one or more edges of a module. The optical-fiber cluster connectors are embedded in indentations around the edges of a multilayer glass/ceramic (MLGC) multi-chip module (MCM), which may be a thermal conduction module (TCM), containing an integrated photonic receiver and/or transmitter for each fiber. Each connector supports a large number of fibers from a single cable, and a large number of connectors may be provided in a single module. Easy plugging and unplugging is obtained for each connector without interferring with any existing cooling apparatus or I/O pins of the module. Receptacle and plug assemblies which hold the fibers in respective key V-grooves etched in silicon members which carry and interlock each fiber in each receptacle. Alignment and locking means is provided in each connector for aligning a plug's array of fibers with corresponding receptacle fibers in one or more angled groove(s) in a receiving receptacle. Thermal coefficients of expansion match between the silicon receptacle and the glass-ceramic substrate to guarantee the preservation of opto-mechanical alignments.

16 Claims, 9 Drawing Sheets

SUBSTRATE-EMBEDDED PLUGGABLE RECEPTACLES FOR CONNECTING CLUSTERED OPTICAL CABLES TO A MODULE

CROSS REFERENCED PATENT APPLICATIONS and PATENTS

This patent application is being filed concurrently with the following related patent applications: Ser. No. 08/101,120 now pending entitled "Pluggable Connectors For Connecting A Module To Large Numbers of Electrical and/or Optical Cables To A Module Through A Seal", Ser. No. 08/101,121 now pending entitled "Substrate-Embedded Pluggable Receptacles For Connecting Clustered Electrical Cables To A Module", and Ser. No. 08/101,118 now pending entitled "Matrix of Pluggable Connectors for Connecting Large Numbers of Clustered Electrical and/or Optical Cables to a Module". Inventorship and assignee of each of these related applications is the same as the inventorship and assignee of the subject application.

Previously filed pertinent applications and issued patents by some of the joint inventors on the subject application include: Ser. No. 07/893,173 now U.S. Pat. No. 5,241,614 entitled "Apparatus and a Method for an Optical Fiber Interface" by L. Jacobowitz and M. E. Ecker, and, Ser. No. 07/951,741 now being allowed entitled "Apparatus and a Method for an Electrical Transmission-Line Interface" by M. E. Ecker and L. Jacobowitz, U.S. Pat. No. 5,155,786 entitled "Apparatus and a Method for an Optical Fiber Interface" by L. Jacobowitz and M. E. Ecker, and U.S. Pat. No. 5,173,668 entitled "Apparatus and a Method for an Electrical Transmission-Line Interface" by M. E. Ecker and L. Jacobowitz.

The disclosures of all of the above applications and patents are incorporated by reference herein.

INTRODUCTION

This invention relates to apparatus and methods for embedding one or more optical fiber connectors into a multilayer single-chip module or multi-chip module (MCM), or into a thermal conduction module (TCM), with integrated photonic receivers and transmitters.

BACKGROUND OF THE INVENTION

Fiber-optic data links have recently emerged to meet telecommunication and computer technology bandwidth requirements. The trend towards more input-/output (I/O) escapes per card edge, more total I/O in electronic packaging, and substrates which perform at high frequencies have created a need for dense fiber connections into electronic modules. Great difficulty has occurred in providing sufficient fiber connector I/Os for multi-chip modules to meet these needs. Thus, the invention deals with the need for more I/O connectors per multi-chip module.

In this specification, the term "module" includes several levels of packaging, as follows: A "substrate" the inner-most part of a module; in the preferred embodiment the substrate is primarily silicon or glass-ceramic. A "chip carrier" is a substrate having semiconductor chips placed thereon in a module, and the chip carrier is a higher level of packaging than the substrate. A "housing" is a frame around the chip carrier to seal or protect the chip carrier and is the outer-most part of a module. In the preferred embodiment described herein, the "module" encompasses a substrate, a chip carrier, and a housing, although at times the term module may be used to refer to one of these parts. A module may be refer to as either a single-chip module or multi-chip module (MCM) according to whether its contained chip carrier has single or multiple chips (i.e. a module may contain one or more chips). An example is the commercially-used thermal conduction module (TCM) constructed with alumina substrates, which is a form of MCM. An upper major surface of the TCM is covered with a thermal cooling structure, and the other major surface is covered with conductive I/O (input/output) pins which are used to plug the module into a computer framework. The substrate in a TCM is constructed with many internal layers of wiring to accommodate the interconnections among multiple chips on the upper substrate surface. The TCM has a thin, low profile shape to support internal cooling in the TCM. Direct contact heat sinks are used. The low profile chip carrier in the module having small edge surfaces compared to the top and bottom surfaces of the chip carrier. The module does not have sufficient area on any surface to provide a desired number of conventional pin-in-hole type connectors, and the narrow edges of the TCM do not contain any conductive I/O pins.

The number of I/Os per MCM is constrained by the inability to have connectors capable of being mounted on the narrow edges of an MCM. Current MCMs are being designed for use in thermal conduction modules (TCMs), which also make their upper surfaces unavailable for I/O connectors due to use for either piston or high conduction cooling fins to remove heat from the semiconductor chips mounted on the MCM surface. Pin array connectors, e.g. harcon, use the bottom of the MCM and prevent its use for optical fiber I/Os.

Optical fiber interconnection for computer modules offers a unique set of advantages in computer system architecture, package design, functionality, and performance. This invention resolves some of the problems associated with realizing these advantages, including simultaneous, precision alignment of optical fiber arrays which can be used with existing multichip module designs.

The preferred embodiment uses preferential crystallographic etching for making its V-grooves in silicon with photolithographic accuracy, which was published previously by Crow et al, "GaAs Laser Array Source Package", OPTICS LETTERS vol. 1, no. 1, p. 40–42 (July 1977). This work also established the feasibility of achieving the required fiber core alignment tolerances.

Brown et al U.S. Pat. No. 4,730,198 extends the V-groove fiber mounting techniques, regarding optimizing the alignment of optical sources (LED or laser) relative to a fiber optic silicon V-groove was treated by Balliet et al, IBM Technical Disclosure Bulletin vol. 24, no. 2, p. 1158–1160 (July 1981).

Methodology for preferred chemical etching of GaAs is given in Commerford and Zory, APPLIED PHYSICS LETTERS vol. 25, no. 4, p. 208–210 (Aug. 15, 1974) and Tsang and Wang, APPLIED PHYSICS LETTERS vol. 28, no. 1, p. 44–46 (January 1976). The extension of fiber V-groove structures to GaAs substrates with self-aligned monolithically integrated lasers was shown by Brady et al, in the IBM Technical Disclosure Bulletin vol. 26, no. 11, p. 5993–5995 (April 1994). Thus, it is clearly recognized that either silicon or GaAs V-grooving techniques may be economically used.

In U.S. Pat. No. 4,732,446 (Gipson et al) optical fibers were embedded in the body of a printed circuit board and interfaced with discrete chip carriers to create a simultaneous optical and electrical data bus network. Multiple printed circuit board layers, separated by aluminum heat sink plates, could be stacked and a card edge connector could form the interface to incoming data cables. Because of the multiplicity of chip carrier interfaces the modal noise and optical power losses of this structure are expected to significantly exceed those of the present invention.

U.S. Pat. No. 5,155,786 (Jacobowitz et. al.) describes an apparatus and method for interfacing external optical fibers into a fluid-sealed multichip module package, and provides for direct fiber attachment to optical sources or detectors within the module. The active optical components are attached to an optical submount, known as an optical sub-assembly, which is attached electrically to the substrate using "controlled collapse chip connection" process (called the C-4 (Controlled Collapsed Chip Connection) process). The C-4 (Controlled Collapsed Chip Connection) process is described on pages 30, 366, 1032, 1080, 1084 and 1135 in a book entitled "Microelectronics Packaging Handbook" by R. R. Tummala and E. J. Rymaszewski copyrighted in 1989 and published by Van Mostrand Reinhold.

SUMMARY OF THE INVENTION

The invention provides a connector for supporting a large number of fibers in a single cable by holding each fiber in a keyed V-groove which carries and interlocks each fiber. A receptacle assembly having optic fibers is mounted in a Thermal Conduction Module (TCM) type of MCM.

The invention provides a pluggable connector system design for simultaneous alignment of optical fiber arrays through the TCM side wall and, allows this connection to be separated and remade without disassembly of the TCM. It is important that the fiber receptacle within the TCM is positioned in a module which may be made from a glass-ceramic substrate using the C-4 (Controlled Collapsed Chip Connection) grid and process to provide opto-mechanical alignment with pre-selected semiconductor chip sites on the substrate, eliminating conventional leads and wiring needed to supply the electrical connections for signals or power.

Advantages of being able to disconnect and re-plug the fiber interface without disassembly of the TCM are increased I/O bandwidth, scalability, increased reliability, availability and serviceability, enabling simple reconfiguration of the external optical channels with different chip sites and functions internal to the TCM. This invention may use the C4 (Controlled Collapse Chip Connection) technology to align optical fibers in the receptacle with pre-selected chip sites, and by its ability to connect optical fibers to chip sites without requiring the fiber to be positioned over the chips where it could interfere with cooling structures that are in physical contact with the top side of the chips. Thermal coefficient of expansion match between the silicon receptacle and the glass-ceramic substrate guarantee the preservation of opto-mechanical alignments achieved with the C4 process.

Pluggability is also significant in enabling hybrid mixes of pluggable copper coax (or other transmission-line media) with pluggable optical fibers on the same MCM substrate. The design of a compatible pluggable copper connector is described in the co-referenced patent applications.

Of the many potential uses of this invention, a few of the preferred examples are described herein.

This invention provides an enabling technology to more fully exploit the benefits of a coupled, parallel processing system; examples include recent supercomputers from IBM which use between 8 and 32 Reduced Instruction Set Computing (RISC) processors configured in parallel, or high performance coupling facilities based on air-cooled or water-cooled processors. Using the invention does not depend on the network protocols, so either single-instruction and multiple data (SIMD) or multiple-instruction and multiple data (MIMD) architectures can be accommodated.

Telecommunication systems have been restricted by the requirements of switching large numbers of channels in an efficient manner, and the switching hub has become a bottleneck for telecommunication networks. Although the electronics for implementing switch functions is well understood, telecommunication networks have been limited by the relatively large size of interconnection hardware, the large number of I/O's required on the chips and modules, and the effective bandwidth for the I/O connections.

This invention enables a significant increase in the number of fiber optic inputs/output (I/O) lines connectable to a module by enabling a cluster (multiplicity) of optical fibers to be connected to each of several distinct pluggable connectors which may be provided along one or more edges of a module. By increasing the number of inputs/outputs (I/Os) of a module and the number of optical fiber lines to each connector, it becomes possible to handle a larger number of switching networks in a telecommunication or computer module using current VLSI (very large scale integration) technology, and to make significantly smaller and less expensive modules using currently available technology. Examples include a significant reduction in the size of the IBM ESCON directors, compact switches for isochronous networks such as Asynchronous Transfer Mode (ATM) and intelligent hubs for networks or switch fabrics such as broadband integrated services digital networks (ISDN). Nonblocking crossbar switching modules are examples of packaging which may have side entry fiber (also see patent application Ser. Nos. 08/101,120, 08/101,121, and 08/101,118 are now pending regarding combinations of optical fiber and coaxial connectors, and large matrices of connectors, including hybrid surface connectors and the sealed modules with thin-film connections to connectors).

The pluggable optical connector provided by this invention makes it possible to manually re-configure computer or telecommunication channels to the I/Os of a module, which was not available with prior fixed (non-pluggable) connectors. This invention now enables optical channels to be easily removed from I/Os of a module and to be easily reinserted into other I/O receptacles in the same module to reconnect optical fiber lines to different chips in the same module, or to different modules, having different functions. This allows quick, easy reconfiguration of a network without interrupting service to non-affected I/Os on the module, such as the previously required powering down, disassembly, and reconnection of lines to a module(s) having unpluggable I/O connections.

For example, the invention has potential application in a microprocessor-to-memory data bus provided in a backplane of a computer system. Conventional computer bus structures connect to modules using either optical fiber bit-serial transmission (for relatively low bandwidths of a few hundred MHz) or copper coaxial cable bit-parallel transmission (for bandwidths greater than a few hundred MHz using byte-parallel transmission). Also, several bit-serial optical fiber lines can be operated to provide parallel transmission, so that together they can handle a channel with a much higher effective bandwidth. This invention can accommodate many different modes of data transfer, and offers the advantage of allowing a processor to use only as much bandwidth as required for a given application, and to add bandwidth as the system grows.

An increase in the number of effective I/Os of a module may be obtained by using time, frequency, or spatial multiplexing on each optical fiber to provide a large number of channels per optical fiber to further utilize the large bandwidth available with optical fibers to the I/Os of a module. Future computer and telecommunication systems may require use multiplexing, such as wavelength-division multiplexing schemes for optical fibers.

The availability of easily disconnectable and reconnectable connectors, other than conventional module pins, provides an additional capability for functional alternating current (AC) testing of the module chips and substrate. Conventional test methods for MCMs involve a combination of continuity direct current DC tests to establish that the circuit pathways within the substrate are operational, and functional AC tests of the module and chip operation. Existing test systems are expensive and complicated by the need for probes which do not affect operation of the module or noncontact tests using high-power lasers and scanning electron microscopy. This invention provides a way to communicate test signals to a module without using its pins or external probes, allowing the module functions to be tested more quickly, and repeatedly after the module is installed.

Further, the invention improves a building block (module) for telecommunication systems that increases their high bandwidth data channels, which for example may be used between microprocessors and direct access storage devices (DASD), such as the Redundant Array of Inexpensive Disks (RAID) which is currently in use. When the bandwidth of the I/O bussing is made sufficiently high, it becomes possible to configure array DASD at very low cost to enhance the function of a computing enterprise.

This invention provides the following unique features:

1. A pluggable connector receptacle made of semiconductor material, such as silicon which can be fabricated with conventional manufacturing materials and processes, and the material having a thermal expansion coefficient matched to material in a module receiving the receptacle.

2. A pluggable connector receptacle for a cluster of optical fibers in which the cluster comprises a large number of fibers, for example, 32 optical fibers.

3. A pluggable receptacle embedded in an edge(s) of a module, such as a Multi-Layer Glass Ceramic (MLGC) module. Precise mechanical means is provided with the receptacle for optical alignment, fine adjustment, and retention for an optical fiber cluster connector containing a large number of fibers, for example 63 fibers.

4. An ability to embedded many optical fiber connectors per edge. (For example, 6 connectors having 63 fibers/connector may be embedded in each 5 inch edge of a TCM to add 192 optical transmission fibers per TCM edge and adding a total of up to 768 optical fibers per TCM when using all of its sides).

5. Bar laser transmitters and receivers, support circuits, and copper power and control lines may be self-contained within any pluggable, cluster connector.

6. A dust plug and a wrap plug for optoelectronic test capability. A "wrap plug" conventionally provides a closed-loop self-test for electric functionally.

7. A side-entry connector in a module enables insertion of a plug into a self-aligning embedded silicon receptacle.

8. A pluggable connector which may contain multiple tiers of stacked layers of optical fibers.

9. V-grooves may be fabricated in graded depth silicon materials to enable optical fibers to slope upwards for close coupling of fiber ends to surface located photonic devices. Significantly improved light transfer efficiencies are achieved in combination with flared core optical fibers at connector interfaces.

10. A continuous glass rod lens transversely positioned across a multiplicity of butting plug/receptacle fiber ends in a connector makes a simple and inexpensive collimated light transition within the connector's receptacle and disconnectable plug.

11. Another type of collimated light transition control in the connector at the receptacle-to-plug interface may be provided by GRIN (Graded Refractive Index) lens.

12. A capture angle is formed at the contact between a plug and its receptacle for each layer of optical fibers in a ribbon cable connected by the connector to obtain precise vertical alignment of ends of all optical fibers in each layer of fibers in a connector.

An object of this invention is to provide a pluggable optical fiber connector for a module, such as for a thermal conduction module (TCM), a single chip module (SCM) and a multi-chip module (MCM).

Another object of this invention is to connect/disconnect fiber cables used to transmit either bit-serial or bit-parallel fiber-optic signals. In the case of bit-parallel signals on plural parallel fibers, CCDs (charge coupled devices) or linear diode-array photoreceivers with shift register output at video data rates may be used.

Another object of this invention is to support receptacle members of pluggable connectors along the edges of a multi-layer glass ceramic (MLGC) substrate to avoid interfering with a cooling structure on a major surface of the module on which semiconductor chips are mounted, or with pins that may be mounted on the other major surface of the module.

A further object of this invention is to obtain precise capture angles, easily manufactured by etched silicon elements to precisely align, mate, and retain densely spaced optical fibers in a easily disconnectable miniature connector.

Still another object of this invention is to provide a multiplicity of pluggable connector members along the edges of a TCM or MCM as I/O or specialized ports supplemental to metal pin I/Os of the module.

Still another object of this invention is to provide multi-tier pluggable connectors.

BRIEF DESCRIPTION OF DRAWINGS

The invention may best be understood with reference to the accompanying drawings.

DETAILED DESCRIPTION OF THE INVENTION

Figure 1:
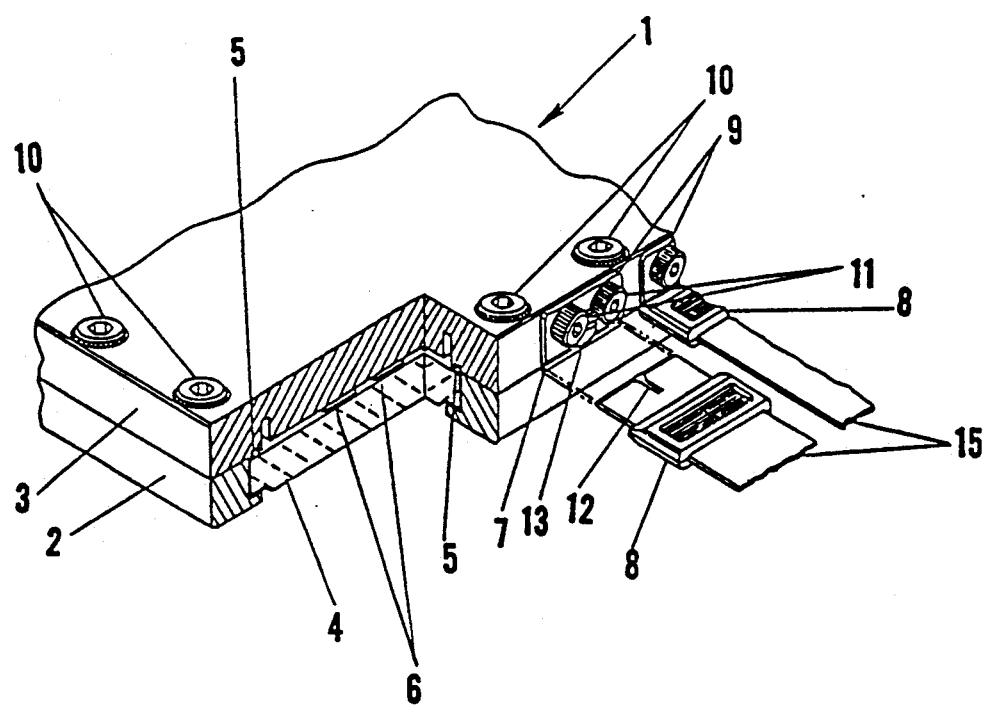
FIG. 1 is a cut away view of a thermal conduction module illustrating the pluggable member of the connector system in a mated and unmated position.

FIG. 1 is an isometric view of a partially sectioned TCM 1, with lower frame 2 and upper frame with integral cold plate 3. Bolts 10 secure the upper frame 3 to lower frame 2 with compression seal 5. The integral cold plate 3 exchanges heat away from semiconductor chips 6, and, provides a protective enclosure for chips 6 and substrate 4. Slot 7 for receiving the pluggable receptacle part 8 is formed by a well in the lower frame 2 and reference surface of a lateral adjustment bracket 9, attached to the upper frame 3 by cap screws 11. Optical fiber ribbon cable 15 interfaces to corresponding fiber studs across a transverse cylinder coupling lens mounted in the embedded receptacle member 19 (not shown).

The reference surface of lateral adjustment bracket 9 has a protrusion for engaging the guide slot 12 of the pluggable cluster connector assembly 8. Lateral adjustment of the right angle bracket 9 is accomplished by loosening cap screws 11, rotating eccentric cam 13, and retightening cap screws 11.

Figure 2:
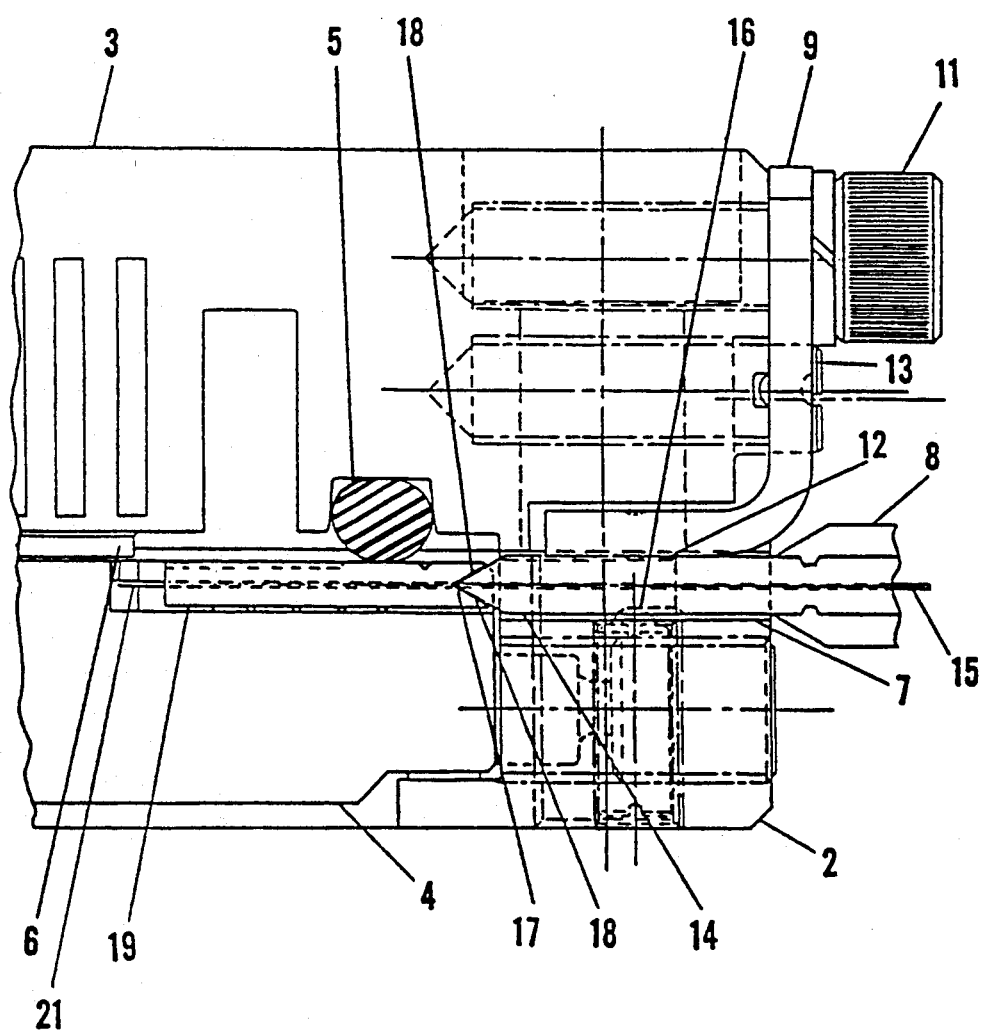
FIG. 2 is an enlarged cross-sectional view of mated connector members, showing mechanical and optical alignment means, and, the fiber end-facet reflection coupling upwards to the underside of the semiconductor chip integrated photonic receiver.

FIG. 2 is a cross-section of the connector system in the mated position. The optical fiber 15 in cluster assembly 8 is inserted into slot 7 across spring loaded ball 16 which, under compression, forces the leading section of the pluggable member 8 against the reference guide plane of bracket 9 and maintains engagement of the protrusion and guide slot 12. This aligns optical fibers 15 with the transverse cylindrical coupling lens 17 and embedded receptacle optical fibers 21. The optical signal path is completed by turning end-facet 26 reflections up to integrated photoreceiver in semiconductor chip 6. Mechanical auto-alignment is effected and assured by capture of the pluggable member into the opposed angled edges 18 of the embedded silicon actuation structure with autostop at the butt position of fiber 15 to cylinder lens 16.

Figure 3:
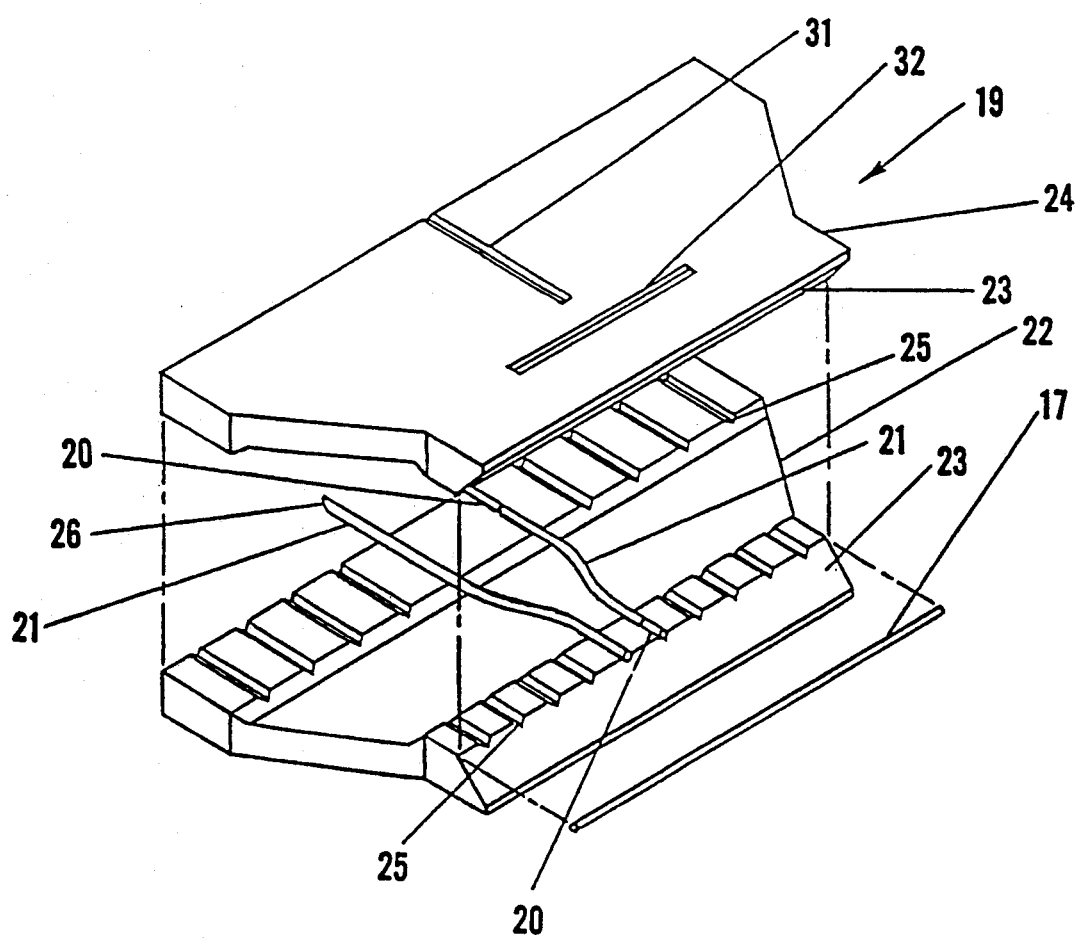
FIG. 3 is an exploded view of the embedded silicon receptacle of the pluggable connector, showing the crossed cylinder coupling lens v-groove fiber carrier, and, the wider pitch of chips to TCM bolt-holes.

FIG. 3 is an exploded view of the embedded silicon receptacle 19. This subassembly is batch fabricated from silicon wafers by an ordered sequence of lithographic masking and preferential etching process steps (e.g., Chemical etch with KOH). Silicon wafers saw cut along the crystallographic plane specified by Miller indices (100) produces facets 23 on upper silicon chip 24 and lower silicon chip 22, with included angle of 114 degrees (sidewall angle of 57 degrees), and, after dicing through the crystallographic plane specified by Miller indices (100) and stacking chip pair 22 and 24 the receptacle included angle is 72 degrees. The vertex of the 57 degree angle forms the optical mount for cylinder lens 17, transverse to fiber array 21. By preferentially etching along (111), 90 degree V-groove mounts 25 are formed for the optical fiber mounts. The wafers for platforms 22 and 24 must be processed on their opposite surfaces to produce alignment grooves 31 and 32 and a pad array under platform 22 for mounting the silicon assembly during embedment in the substrate. After dicing the grooved platforms 22 and 24 from their parent wafers, suitable short length fibers 21 are mounted and bonded into lower platform 22 to a depth of half their clad diameter (63 microns). Upper platform 24 is brought into proximity of platform 22 and corresponding open v-grooves capture the upper half-diameter of the optical fibers, seat over them, and are bonded to complete the receptacle optical assembly. All optical fibers 21 are oriented with polished end-facets 26 overhanging by a predetermined length the silicon platform sandwich to provide the lightwave signal path to the photonic receiver integrated into the semiconductor chips 6 on the surface of the multichip substrate.

A potentially simplifying alternate embodiment is to eliminate the crossed cylinder lens 17, and, to replace the fiber studs with equal length studs of grin lens media with end-face facets to reflect optical data signals up to the photonic receiver.

Significant optical design benefits would be realized by alleviating alignment tolerances at both optical fiber interfaces, and increased light collection efficiency with the grin-lens' increased numerical aperture (i.e., light cone angle).

The problem of aligning the optical axes of optical fibers across connector gaps can be minimized by introducing a grin-lens segment 20 on each side of the connector gap to produce a collimated light transition instead of conventional approaches of trying to get the fiber end faces close enough to collect the conjugate diverging light cones. Thus, in FIGS. 2 and 3, grin studs are positioned in the v-grooves of the receptacle and pluggable members of the connector system at suitable mutual separation distance to effect collimation. In the case of laser transmitters, a grin-lens positioned one focal length distance from the lasing junction can be effective in reducing the divergence and significantly improve collection efficiency of light launched into the receiving optical fiber.

The lens/fiber interface is in physical contact in this design, which minimizes reflection loss and improves plug repeatability.

The alternate embodiment using GRIN lenses is more tolerant to misalignment, which makes up for the additional reflection-induced loss at the glass-air interface. In either case, an advantage of this connector is the achievement of repeatable low connection loss without the need for index-matching gels.

Figure 4:
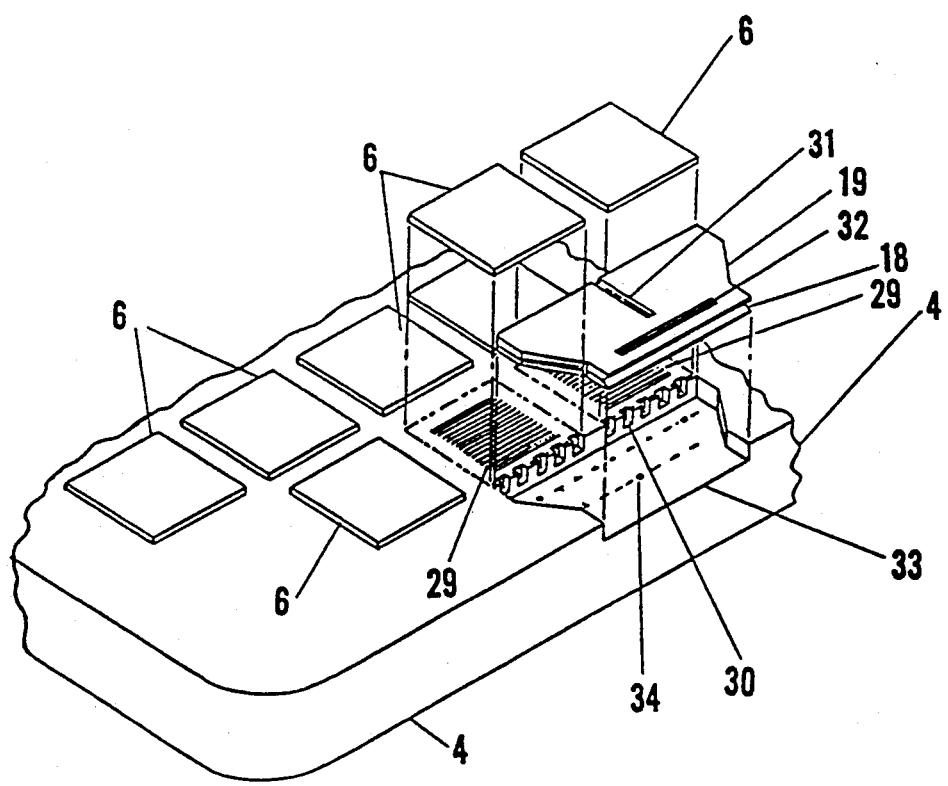
FIG. 4 shows an exploded view of the embedded silicon receptacle with access channels to the underside of the semiconductor edge, and, method of bonding to the substrate.

FIG. 4 illustrates a partial exploded view of a substrate edge with a well 33 for embedding the silicon optical subassembly receptacle member 19 of the pluggable connector system. At the bottom of the well 33 is an array of metal pads 34 for reflow bonding to the corresponding pad array on the underside of the silicon receptacle structure 19. The bonding alloy used is a eutectic 73% Gold/27% Indium with a liquidus/solidus temperature of 451 degrees Centigrade.

The well is created in the ceramic substrate by punching an appropriate opening in the affected green sheets and filling the opening with a compatible slurry containing a particulate matter of a higher sintering temperature than the substrate composition. The number of layers containing the non-sinterable openings is calculated to control the depth of the desired well, after planarization considerations. The first sinterable layer below the stack of non sinterable openings contains the punched and filled vias for the array of metal pads 34. After sintering, sizing and planarization of the substrate, the non sinterable particulate material is removed from the cavity.

The silicon receptacle structure 19 is registered and reflowed to pad array 34 at the bottom of well 33. During the reflow operation the alignment grooves 31 an 32 on the top surface of the silicon subassembly 19 are engaged by a vacuum-assisted alignment tool and adjusted to proper registration with the C-4 array of the chip site pair along its edge. This positions the silicon subassembly flush with the planarized surface of the substrate 4 and aligns the fiber ends 26 at the rear of the lower silicon platform 22 with the extended C-4 pad grid of the two adjacent chip sites 29.

After solidification of the Gold-Indium alloy bond to pads 34, a perimeter band is placed about the substrate so that sealing plugs are introduced to the triangular openings formed by the angled edges 18 of the silicon receptacle member 19. With the plugs secured in place, a polyimide resin is used to encapsulate the silicon receptacle structure 19 and cured. The top surface is then subjected to a skim grind and polish operation to establish a final planarization of the top surface and the encapsulated regions.

Access channels 30, formed in the above described method for creating the silicon receptacle well, are now in alignment with the fiber elements 21 contained in the v-groove mounts of silicon receptacle 19. As shown in FIG. 3, fiber elements 21 are disposed with beveled end-facet 26 to penetrate access channel 30 directly below photonic receivers 36 on semiconductor chip 6.

Figure 5:
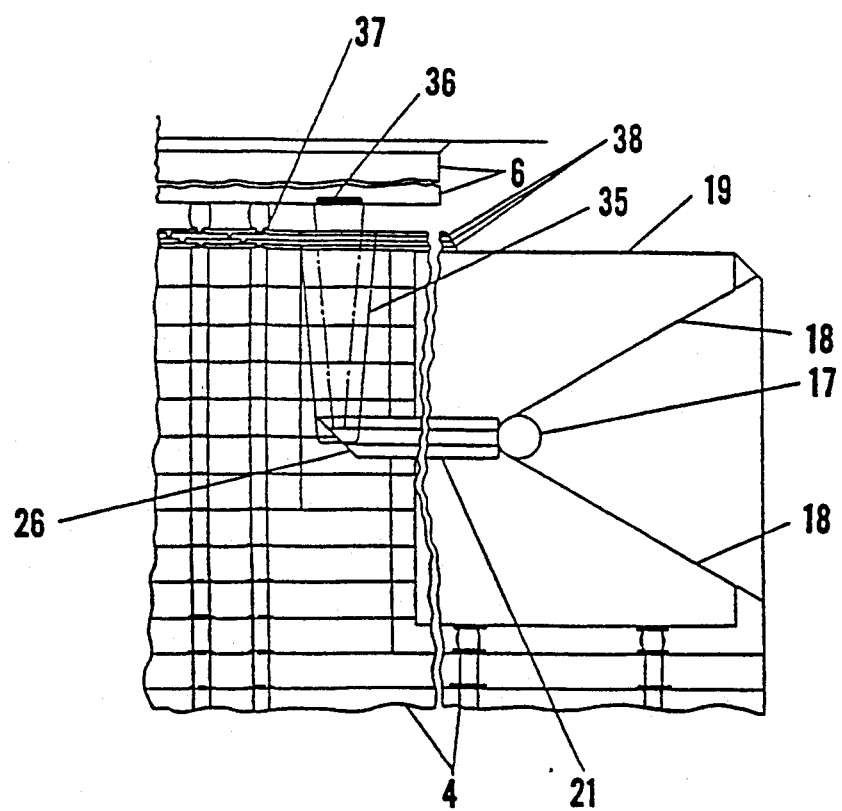
FIG. 5 is an enlarged partial cross-section of the embedded silicon guide actuation structure, showing optical coupling into an open via up to the photonic receiver on the underside of the C-4 bonded semiconductor chip.

FIG. 5 shows a partial cross section of the embedded optical subassembly which comprises the interfaces 17,18 between the pluggable connector member 8 and pluggable receptacle member 19, and the optical transition 21,26 to opened via 35 to the photonic receiver 36 integrated into the semiconductor chip 6. The electrical signals and power to photonic receiver 36 are provided by conventional electrical interconnections used in TCM and MCM multilayer substrate 4 wiring by vias 37 and thin films 38. The broken-line illustrates the light cone emerging from fiber facet 26 and illuminating photonic receiver 36. For an optoelectronic integrated circuit (OEIC) chip, a vertically emitting or etched mirror laser transmitter may be positioned at location 36 to communicate in the reverse direction from the photonic receiver's signal inputs.

Figure 6A:
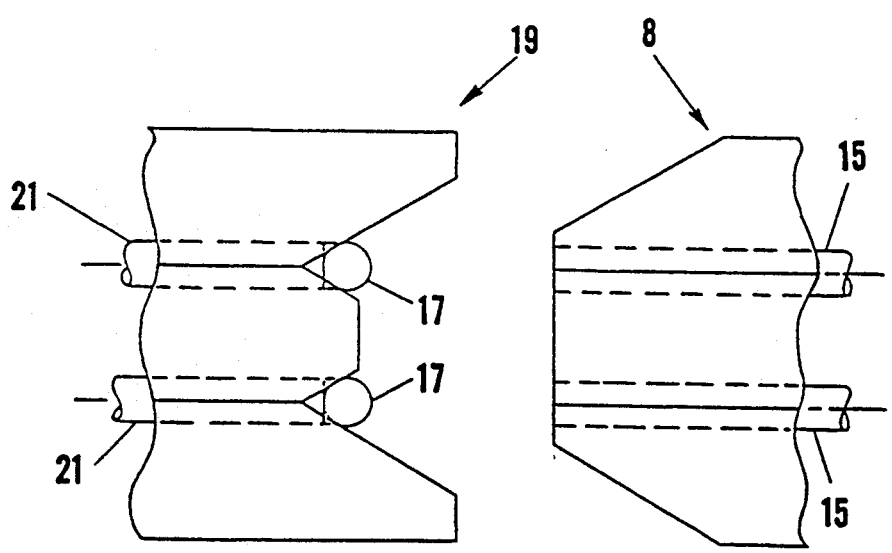
FIG. 6A shows the dual-tier configuration of the embedded silicon receptacle.

FIG. 6A shows an alternate embodiment for duplex communication, or, for increasing the number of I/O's of the TCM or MCM. Shown in FIG. 6A is the dual-tier stackability of the receptacle member of the pluggable connection system. Optical fibers 15 in the upper tier interface at cylinder lens 17, followed by a core-flared transition optical fiber 21, 26 mounted in an upward graded slope v-groove to more closely optically couple the fiber to the highly diverging light cone from a laser chip flip-mounted (junction down) on the surface of the multichip substrate. The graded slope silicon v-groove is created by photolithographic masking a trapezoid of (100) cut crystal during preferential etching, and, otherwise, following the process description given above for forming lower silicon platform 22. The less stringent requirement for coupling to receivers naturally places the lower tier at greater substrate depth. Laser array bars can be mounted on the surface of the multichip substrate between semiconductor chips 6, or, along the substrate periphery at the access channels 33. Serializing and encoding circuits may be integrated in the semiconductor chips and wired to the laser transmitters through the thin film wiring on the multichip substrate surface.

Figure 6B:
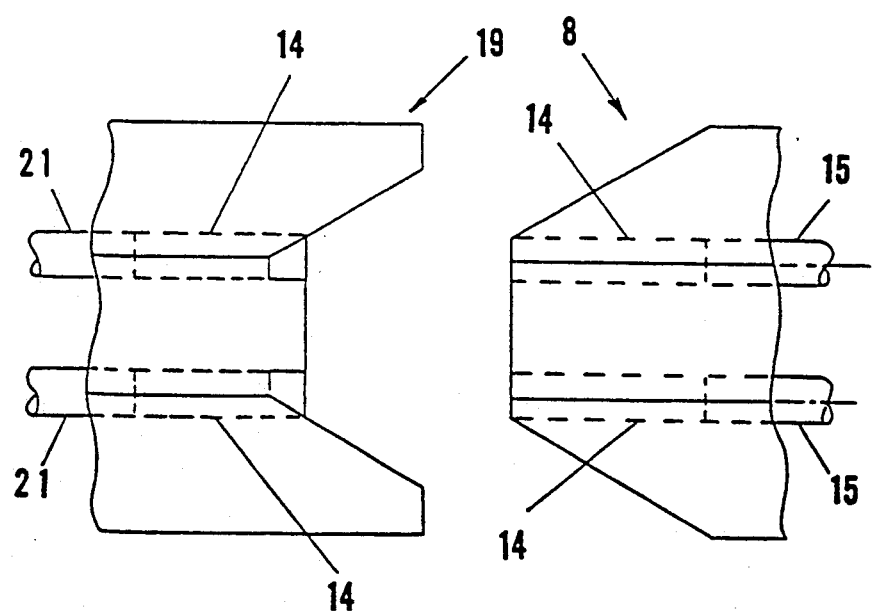
FIG. 6B shows a dual-tier optical fiber with grin lens segments at the fiber ends.

FIG. 6B illustrates the dual-tier pluggable and embedded optical fiber interface with grin lens segments 14 at the fiber end faces. Tri-level silicon support members are modified to provide appropriate limited engagement.

Figure 7:
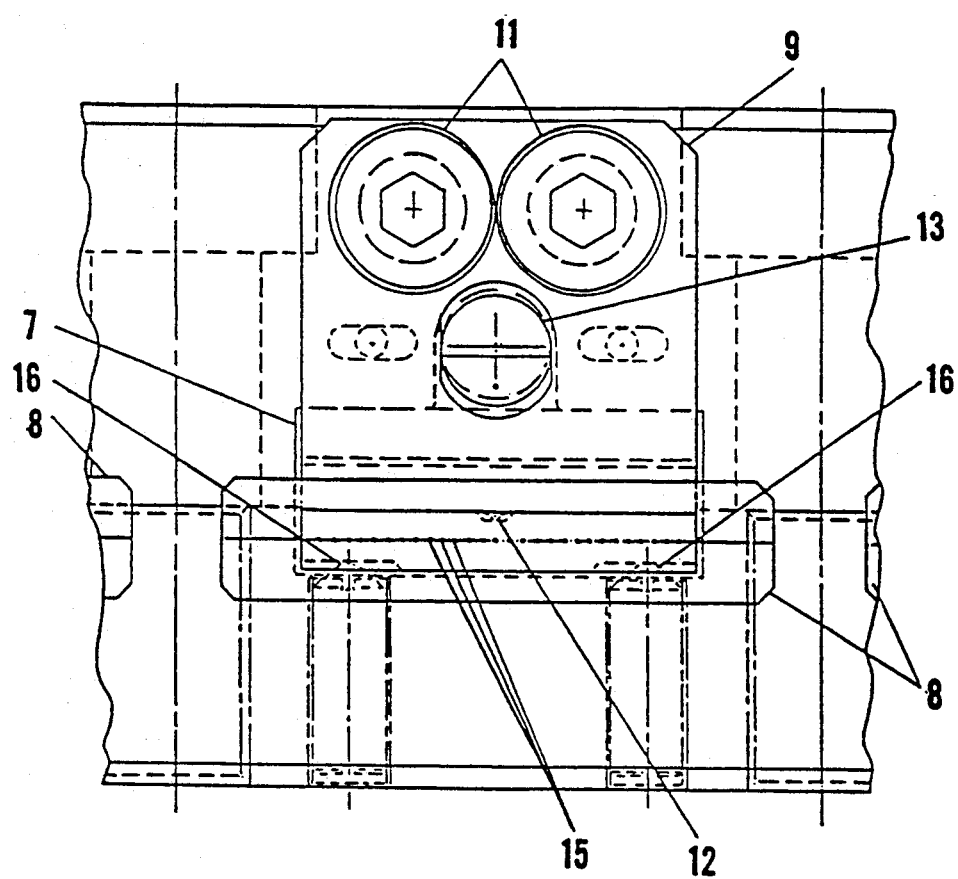
FIG. 7 is a partial cross-sectional elevation of the pluggable member of the connector system, with lateral position adjustment cam, and, spring-loaded retention devices and detents.

FIG. 7 illustrates a partial cross-sectional elevation view of the pluggable connector system in the mated position. The pluggable connector assembly 8 is shown in slot 7 with bracket 9, cam 13, cap screws 11, and protrusion aligned in guide slot 12. Spring-loaded elements 16 are shown in their detents pressing assembly 8 against and along the upper reference surface of bracket 9.

Figure 8:
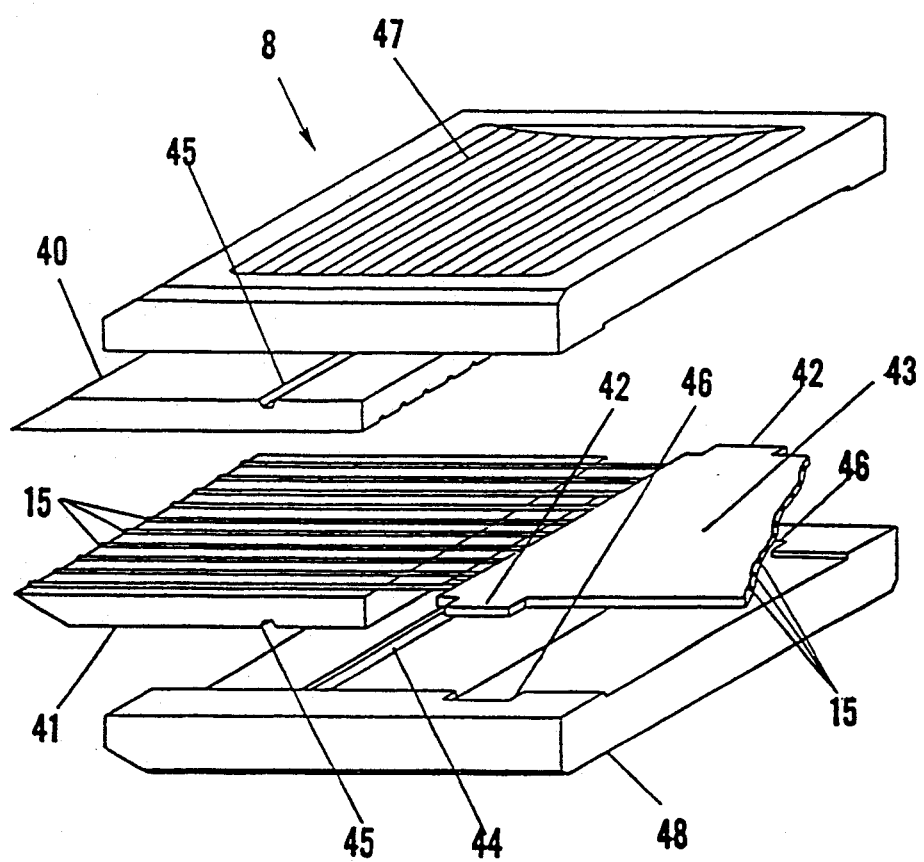
FIG. 8 shows an exploded view of the pluggable member of the connector system with low-profile connector housing.

FIG. 8 illustrates an exploded isometric view of the pluggable connector member 8. The lower silicon guide block 41 is shown with optical fibers 15 in preferentially etched V-groove mounts on the upper surface and keyed slot 45 on the lower surface. Upper guide block 40 is the mirror image conjugate of lower guide block 41. The lower silicon carrier member 41 is placed in the lower plastic housing 48 so that rib 44 engages groove 45. Retention ears 42 provide positive locking of the fiber ribbon cable 43 into retention well 46 in the lower connector housing 48. Similar corresponding features lock the upper guide block 40 to rib retention well 45 on the upper surface of upper guide block 40 inter-lock with the semi-buried fibers 15 to complete the fiber carrier support assembly 8. Upper plastic housing 47 and lower plastic housing 48 are assembly bonded together. Ridged surface 49 provides non-slip handling.

When optical ports are not in use, the lens 17 can be protected with a dust cover or protective plug. This plug has the same design as the pluggable connector shown in FIG. 8, but without the associated optics. It consists of simply the connector assembly with a piece of etched silicon that mates with the embedded connector to cover the cylindrical lens. A similar cover can be conceived for the pluggable side of the connector when it is not in use.

As an additional enhancement, the connector shown in FIG. 8 can be modified for use as a wrap plug for optoelectronic testing. Adjacent optical fibers 15 would be fusion spliced together so that an optical output signal from the module would be wrapped to the adjacent input signal. The use of wrap and protect plugs makes it possible to fabricate a multichip module with several partitioned edge connectors and then use only a few connections in the application. The remaining connection ports can be covered with wrap or protect plugs when not in use. The additional capacity can be added at any time by removing the protect/wrap plug and inserting a pluggable connector. This provides extendibility in the application.

It should be understood that the above-described embodiments of this application are presented as examples and not as limitations. Modification may occur to those skilled in the art. Accordingly, the invention is not to be regarded as being limited by the embodiments disclosed herein, but as defined by the appended claims.

Having thus described our invention, what we claim as new and desire to secure by Letters Patent is:

1. A connector for coupling an optical cable to an electronic module, comprising
   a multiplicity of optical fibers supported in the cable for communicating optical signals,
   electrical connections in the module connecting to one or more electronic chips on the module,
   a photonic receptacle supported in an edge of the module and formed with a plug interface angle for receiving a plug means supporting an end of the optical cable,
   the photonic receptacle, further comprising:
      a plurality of receptacle optical fibers, a module end of each receptacle optical fiber being supported in optical alignment with a photonic receiver, transmitter or transceiver fixed to the module, a plug end of each receptacle optical fiber supported at a vertex of the plug interface angle formed in the receptacle,
   the plug means, further comprising:
      a plug guide for clamping ends of optical fibers in the cable in a fixed inter-relationship equal to a fixed inter-relationship among the plug ends of the receptacle optical fibers, and a conjugate angle formed at an end of the plug guide for engaging the plug interface angle formed in the receptacle, and
   lens means supported in the vertex of the plug interface angle formed in the receptacle for engaging the plug end of the receptacle optical fibers to communicate light between the ends of the optical fibers in the cable and matching plug ends of receptacle optical fibers.

2. An optical signal connector as defined in claim 1, further comprising:
   a light transmitting rod fastened in the vertex of each plug interface angle in the receptacle for communicating light signals between mating optical fibers in the plug and receptacle.

3. An optical signal connector as defined in claim 1, further comprising:
   a GRIN lens fastened to the plug end of each receptacle optical fiber for communicating light signals with a mating optical fiber in the plug.

4. An optical signal connector as defined in claim 1, further comprising:
   the cable consisting of an array of one or more layers of optical fibers in a ribbon jacket, each optical fiber capable of communicating an independent sequence of optical signals, the plug guide clamping each layer of optical fibers in the cable, a conjugate angle formed at the end of each layer, and
   the receptacle formed with a plug interface angle for each layer of optical fibers supported by the plug.

5. An optical signal connector as defined in claim 4, further comprising:
   the cable having a single layer of optical fibers, the plug guide supporting the ends of the optical fibers in the cable in a plane, and the receptacle supporting the plug ends of the receptacle optical fibers in a corresponding plane.

6. An optical signal connector as defined in claim 4, further comprising:
   the cable having multiple layers of optical fibers,
   the plug guide supporting the ends of the optical fibers in each layer in the cable in a plane,
   the receptacle supporting plug ends of the receptacle optical fibers in multiple layers matching the ends of the layers in the plug, and
   the module ends of the fibers in the multiple layers in the receptacle formed to fan out into a plane in which the module ends are in light signal alignment with the photonic receivers, transmitters or transceivers.

7. An optical signal connector as defined in claim 3, further comprising:
   a plug alignment mechanism built into the receptacle for aligning the plug means when the plug is engaged with the receptacle, the plug alignment mechanism moving the one or more layers in the plug laterally along the vertex of each plug interface angle formed in the receptacle to maximize light transmission between mating fibers in the receptacle and plug.

8. An optical signal connector as defined in claim 7, further comprising:
   ceramic, silicon, and/or glass with embedded wiring comprising the module, and
   one surface of the module having one or more electronic chips electrically connected to some of the embedded wiring in the module for distributing electronic signals communicating with light signals received/transmitted by the photonic receivers, transmitters or transceivers supported by the module.

9. An optical signal connector as defined in claim 8, further comprising:
   thermal cooling means engaging either or both surface(s) of the module.

10. An optical signal connector as defined in claim 9, further comprising:
    each major surface of the module being mountable with chips, thermal cooling means, and photonic receivers, transmitters or transceivers without interferring with connectability and disconnectability of the plug and receptacle.

11. An optical signal connector as defined in claim 10, further comprising:
    each edge of the module allowing one or more receptacles to be supported therein without plug connection and disconnection to each receptacle interfering with use of any major surface of the module for mounting electronic chips, thermal cooling means, photonic receivers, transmitters and transceivers for enabling large numbers of optical fibers to be connected to a single module.

12. An optical signal connector as defined in claim 11, further comprising:
receptacle support means holding the receptacle optical fibers, and the receptacle support means being made of ceramic, silicon, and/or glass with embedded wiring enabling the receptacle support means to be fastened to an indentation in an edge of the module by a fastening process used for binding electronic chips, photonic receivers, transmitters or transceivers to the module.

13. An optical signal connector as defined in claim 12, in which the fastening process further comprises:
a Controlled Collapsed Chip Connection (C4) process.

14. An optical signal connector as defined in claim 12, further comprising:
one or more optical fibers in the receptacle not having a mating optical fiber in the plug to enable a receptacle to be used with a plug having less optical fibers than in the receptacle to obtain scalability in the size of a cable which can be used with any plug.

15. An plurality of connectors for engaging a plurality of optical cables each containing an array of optical fiber transmission lines for communicating optical signals, comprising:
a module having a surface containing one or more electronic chips,
a plurality of optical receptacles supported in one or more edges of the module,
a plurality of plugs each formed over an end of a respective optical cable,
each receptacle formed with groves for supporting a plurality of receptacle fibers respectively having plug ends for mating with corresponding ends of optical fibers in an engaged plug, at least one interface angle formed in mating surfaces of each engaged receptacle and plug for enabling a continuous transmission of light signals between cable fibers and mating receptacle fibers, and
another end of each receptacle fiber in each connector being light aligned with a photonic receiver, transmitter or transceiver mounted on the module.

16. An plurality of connectors for engaging a plurality of optical cables to an electronic module as defined in claim 15, comprising:
a lens supported against the ends of the receptacle fibers in each connector in the vertex of the interface angle for mating with corresponding fibers in a cable supported by a matching plug.

* * * * *